(12) United States Patent
Ikeoh et al.

(10) Patent No.: US 10,714,888 B2
(45) Date of Patent: Jul. 14, 2020

(54) PULSED ELECTROMAGNETIC-WAVE GENERATOR AND MEASURING APPARATUS

(71) Applicants: Toshiyuki Ikeoh, Sendai (JP); Yasuhiro Higashi, Sendai (JP); Yoshio Wada, Sendai (JP); Takumi Satoh, Sendai (JP); Hiroaki Minamide, Saitama (JP); Kouji Nawata, Saitama (JP); Yuma Takida, Saitama (JP)

(72) Inventors: Toshiyuki Ikeoh, Sendai (JP); Yasuhiro Higashi, Sendai (JP); Yoshio Wada, Sendai (JP); Takumi Satoh, Sendai (JP); Hiroaki Minamide, Saitama (JP); Kouji Nawata, Saitama (JP); Yuma Takida, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/292,381

(22) Filed: Mar. 5, 2019

(65) Prior Publication Data
US 2019/0280454 A1   Sep. 12, 2019

(30) Foreign Application Priority Data

Mar. 12, 2018 (JP) .................................. 2018-044783

(51) Int. Cl.
*H01S 3/16* (2006.01)
*H01S 3/11* (2006.01)
(Continued)

(52) U.S. Cl.
CPC .............. *H01S 3/11* (2013.01); *G02F 1/3551* (2013.01); *H01S 3/0092* (2013.01);
(Continued)

(58) Field of Classification Search
CPC .............. G02F 1/3551; G02F 2202/06; G02F 2202/20; H01S 3/0092; H01S 3/0621;
(Continued)

(56) References Cited

U.S. PATENT DOCUMENTS 8,953,647 B1 * 2/2015 Mead ................... H01S 3/06754
372/6
2003/0227668 A1  12/2003 Imai et al.
(Continued)

FOREIGN PATENT DOCUMENTS

| JP | H11-108836 | 4/1999 |
| JP | 3747319 | 12/2005 |
| JP | 4657956 | 1/2011 |

*Primary Examiner* — Mark R Gaworecki
(74) *Attorney, Agent, or Firm* — Oblon, McClelland, Maier & Neustadt, L.L.P.

(57) ABSTRACT

A pulsed electromagnetic-wave generator includes an excitation light source, a laser resonator, a pulse generating unit, and a wavelength converting unit. Excitation light from the excitation light source enters the laser resonator. The pulse generating unit is configured to generate a pulsed light group including at least two or more pulses with different frequencies ($\omega$) and different oscillation timings (t) in one excitation process of the excitation light source, an oscillation frequency difference ($\Delta\omega$) between the pulses in the pulsed light group being an integral multiple of a Free Spectral Range (FSR) of the laser resonator. The pulsed light group enters the wavelength converting unit. The wavelength converting unit is configured to generate a pulsed electromagnetic wave in which a wavelength of each pulse in the pulsed light group is converted.

5 Claims, 12 Drawing Sheets

(51) Int. Cl.
*G02F 1/355* (2006.01)
*H01S 3/00* (2006.01)

(52) U.S. Cl.
CPC .......... *H01S 3/1611* (2013.01); *H01S 3/1623*
(2013.01); *H01S 3/1643* (2013.01); *G02F 2202/06* (2013.01); *G02F 2202/20* (2013.01)

(58) Field of Classification Search
CPC ............... H01S 3/0627; H01S 3/08031; H01S 3/094053; H01S 3/09415; H01S 3/11; H01S 3/113; H01S 3/1611; H01S 3/1623; H01S 3/1643
See application file for complete search history.

(56) References Cited

U.S. PATENT DOCUMENTS

| | | | |
|---|---|---|---|
| 2007/0215795 A1 | 9/2007 | Kameyama et al. | |
| 2007/0253453 A1* | 11/2007 | Essaian ................... | H01S 3/109 372/22 |
| 2008/0317072 A1* | 12/2008 | Essaian ................... | H01S 3/109 372/10 |
| 2011/0304853 A1* | 12/2011 | Yamada ................ | H01S 5/0656 356/479 |
| 2012/0188554 A1* | 7/2012 | Inoue .................. | H01S 3/08013 356/479 |

* cited by examiner

FIG.8
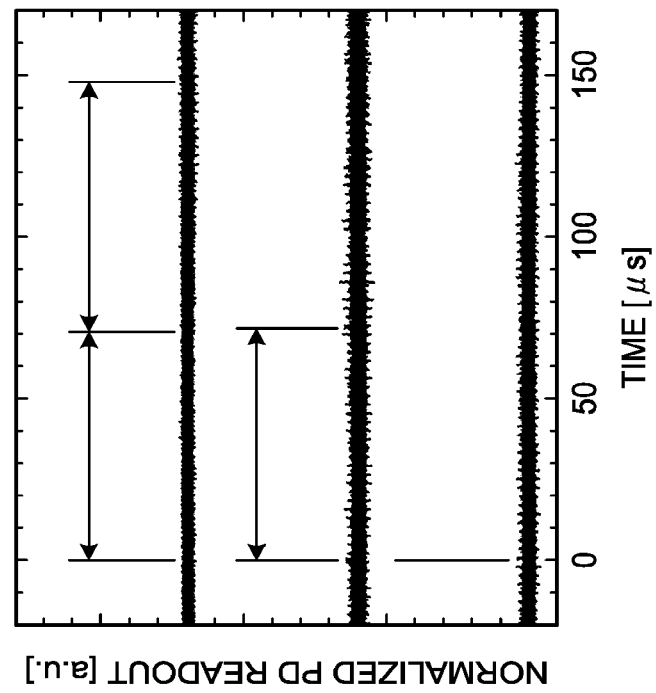
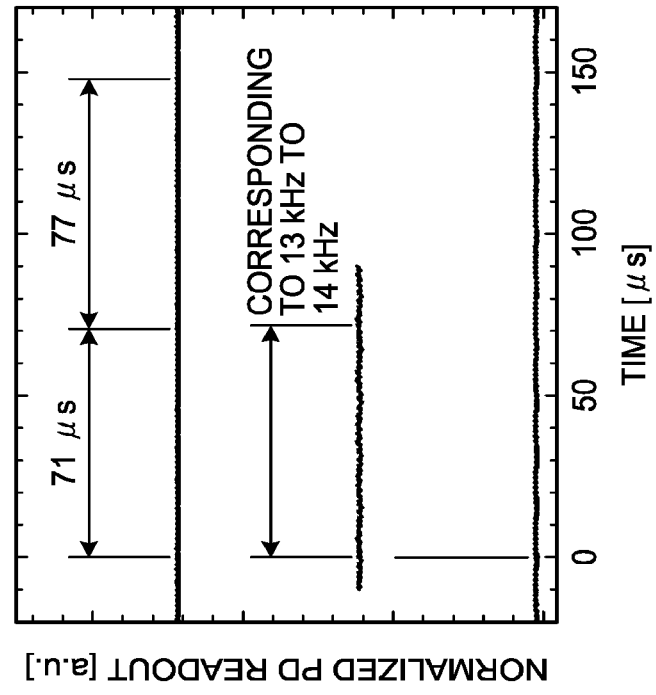

PULSED ELECTROMAGNETIC-WAVE GENERATOR AND MEASURING APPARATUS

CROSS-REFERENCE TO RELATED APPLICATIONS

The present application claims priority under 35 U.S.C. § 119 to Japanese Patent Application No. 2018-044783, filed on Mar. 12, 2018. The contents of which are incorporated herein by reference in their entirety.

BACKGROUND OF THE INVENTION

1. Field of the Invention

The present invention relates to a pulsed electromagnetic-wave generator and a measuring apparatus.

2. Description of the Related Art

In recent years, high speed and highly sensitive molecule measurement (quantitative evaluation) apparatus has been in increasing demand for the purpose of environmental measurement to measure carbon dioxide or water vapor concentration in atmosphere, gas sensing to prevent spread of terrorism and hazardous substances, and the like. As one of such technique, gas sensing using terahertz wave having characteristic absorption spectrum (fingerprint spectrum) with respect to gases has been receiving attention.

Differential absorption LiDAR is a spectroscopy to perform molecule measurement and concentration measurement by using an ON wavelength, the frequency of which is matched to an absorption wavelength of a subject of measurement, and an OFF wavelength, the frequency of which is shifted from the ON wavelength. The differential absorption LiDAR is used for measurement of carbon oxide concentration in atmosphere, and the like.

The terahertz waveband is a frequency range in which fingerprint spectra of various substances are present, and the molecule measurement using terahertz waves has been receiving attention in various fields, such as medicine and security. As one of terahertz wave sources, the injection-seeded terahertz-wave parametric generation (is-TPG) that uses nonlinear optical effects is available. The frequency of the terahertz wave generated by is-TPG is determined based on a frequency difference of pump light and seed light that enter a nonlinear optical crystal. Because a high peak power is necessary as pump light in this is-TPG, a solid state laser is used. That is, an oscillation wavelength of the pump light is roughly determined by a laser medium of the solid state laser.

Japanese Patent No. 3747319 discloses a technique of acquiring a frequency spectrum in a terahertz waveband by sweeping a wavelength of a seed source that has a wavelength variable function in terahertz spectrum using is-TPG.

However, according to the technique described in Japanese Patent No. 3747319, the speed of switching terahertz wave frequencies is restricted by a repetition frequency of a solid state laser, and the repetition frequency is of 100 hertz (Hz) order. Therefore, when a substance that is apt to change the concentration depending on an environmental situation is measured, degradation in measurement accuracy is considered as a problem that is caused because the condition of a measuring object changes while frequencies of terahertz wave are switched for measurement, that is, before the solid state laser is oscillated.

SUMMARY OF THE INVENTION

A pulsed electromagnetic-wave generator includes an excitation light source, a laser resonator, a pulse generating unit, and a wavelength converting unit. Excitation light from the excitation light source enters the laser resonator. The pulse generating unit is configured to generate a pulsed light group including at least two or more pulses with different frequencies ($\omega$) and different oscillation timings (t) in one excitation process of the excitation light source, an oscillation frequency difference ($\Delta\omega$) between the pulses in the pulsed light group being an integral multiple of a Free Spectral Range (FSR) of the laser resonator. The pulsed light group enters the wavelength converting unit. The wavelength converting unit is configured to generate a pulsed electromagnetic wave in which a wavelength of each pulse in the pulsed light group is converted.

BRIEF DESCRIPTION OF THE DRAWINGS

FIG. 8 is a diagram showing a measurement result of an optical pulse and a terahertz wave pulse from the microchip laser;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
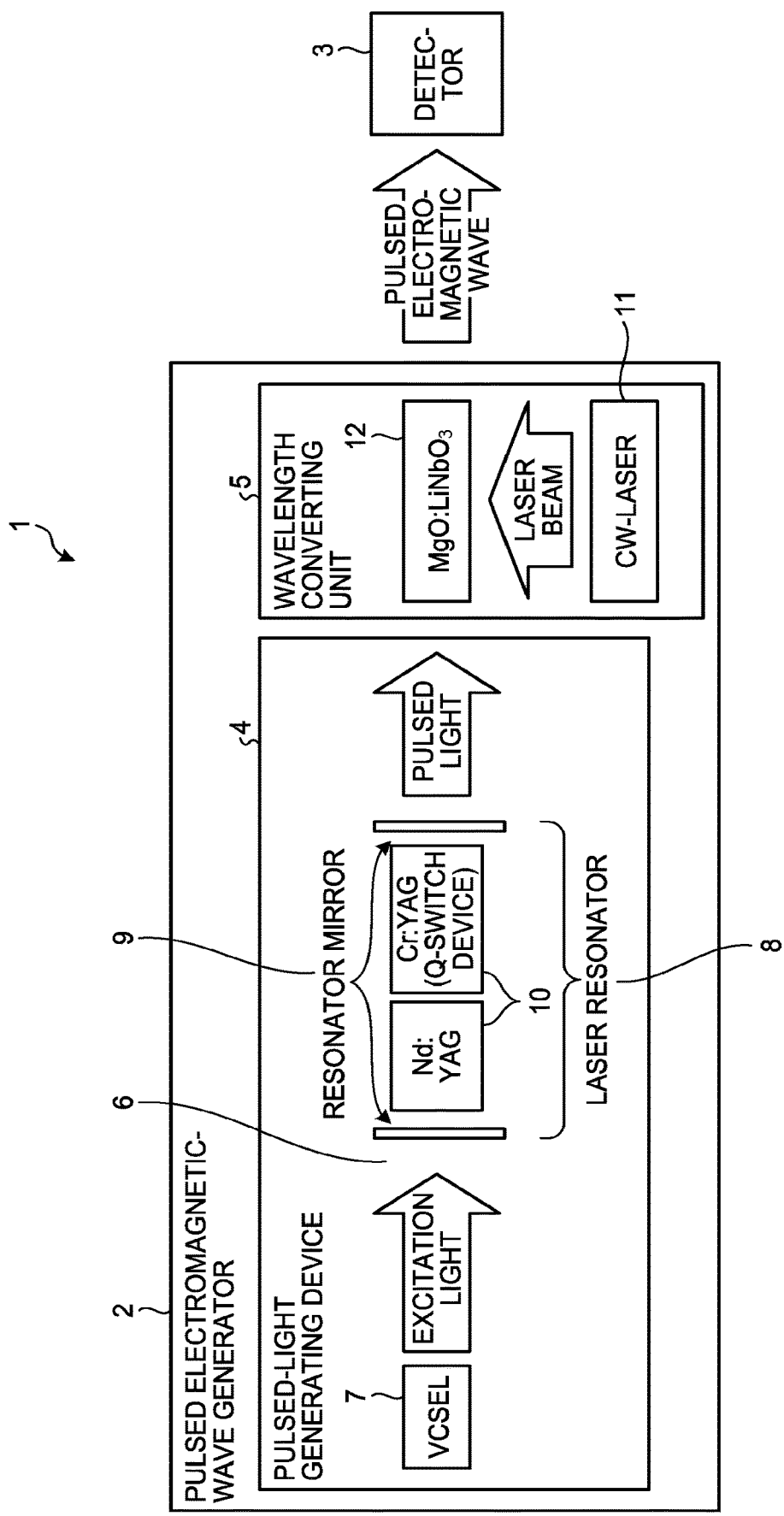
FIG. 1 is a diagram showing a configuration of a measuring apparatus according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide a pulsed electromagnetic-wave generator and a measuring apparatus that emit pulsed electromagnetic waves of different frequencies at short time intervals.

An embodiment of a pulsed electromagnetic-wave generator and a measuring apparatus is explained in detail below with reference to the accompanying drawings.

FIG. 1 is a diagram showing a configuration of a measuring apparatus 1 according to an embodiment. As shown in FIG. 1, the measuring apparatus 1 includes a pulsed electromagnetic-wave generator 2 and a detector 3. The pulsed electromagnetic-wave generator 2 includes a pulsed-light generating device 4 and a wavelength converting unit 5. The detector 3 detects a terahertz wave (THz wave) pulse generated by the pulsed electromagnetic-wave generator 2.

As shown in FIG. 1, the pulsed-light generating device 4 includes a microchip laser 6 that oscillates a high-peak-power short-pulse laser beam.

As shown in FIG. 1, the wavelength converting unit 5 includes a seed laser (CW-Laser) 11 that is a semiconductor laser oscillating a continuous wave of a single wavelength, serving as a seed source. Moreover, the wavelength converting unit 5 includes a wavelength converting device 12 applying the injection-seeded terahertz-wave parametric generation (is-TPG) to generate a monochromatic terahertz wave by using a lithium niobate crystal (MgO:LiNbO$_3$ crystal), which is a nonlinear optical crystal, enabling non-collinear phase-matching parametric generation.

The microchip laser 6 includes a fiber-coupled high-power vertical cavity surface emitting laser (VCSEL) (surface-emitting semiconductor laser) 7 and a laser resonator 8. The laser resonator 8 has a Nd:YAG/Cr:YAG composite crystal 10 that generates a high-peak-power short pulse laser, receiving excitation light from the VCSEL 7. Cr:YAG is a pulse generating unit (Q-switch device). The Nd:YAG/Cr:YAG composite crystal 10 has an AR 808 nanometers (nm)/HR 1064 nm coating on an excitation light incident surface, and an R=30 to 70%@1064 nm coating on an emitting surface. Moreover, the laser resonator 8 has a resonator mirror 9.

Figure 2:
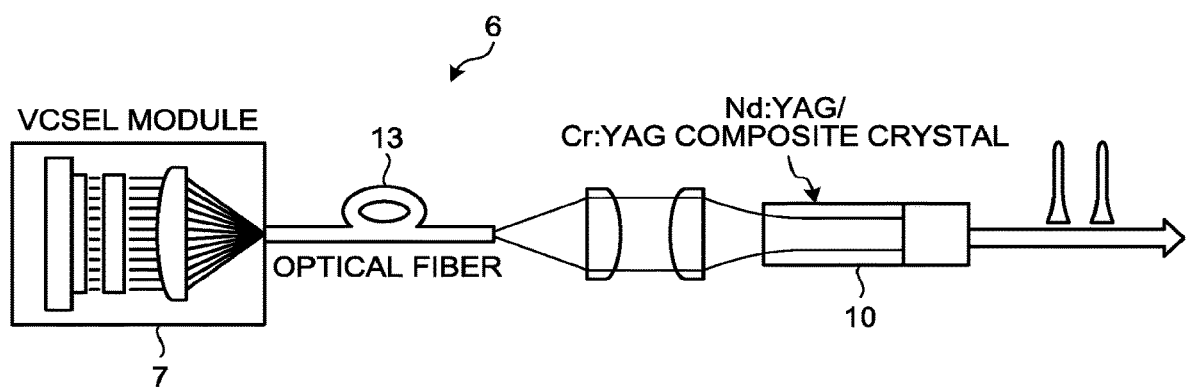
FIG. 2 is a diagram showing a configuration of a microchip laser.
Figure 3:
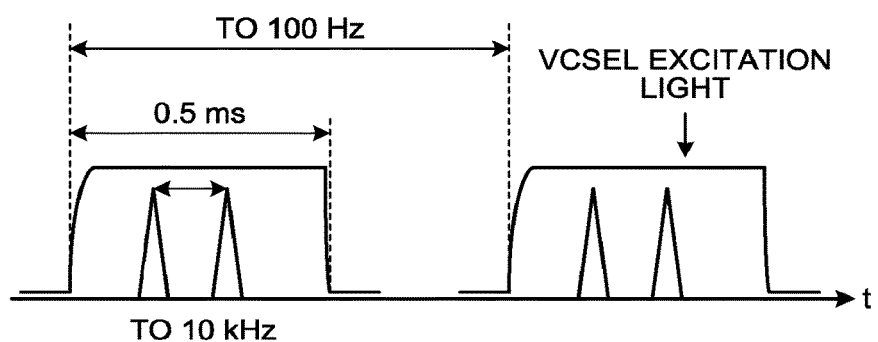
FIG. 3 is a diagram showing an example of pulsed light.

FIG. 2 is a diagram showing a configuration of the microchip laser 6, and FIG. 3 is a diagram showing an example of pulsed light. As shown in FIG. 2, the microchip laser 6 transfers excitation light from the VCSEL 7 through an optical fiber to input to the Nd:YAG/Cr:YAG composite crystal 10.

As shown in FIG. 3, light emitting time of the VCSEL 7 is 0.5 milliseconds (ms) to 1 ms, and the repetition frequency of emitted light is 1 Hz to 100 Hz. The microchip laser 6 oscillates high-peak power pulses at intervals of approximately 10 kilohertz (kHz) during a light emitting period of the VCSEL 7. The number of pulses oscillated finally is determined by pulse-emission time interval, and by oscillation time and output intensity of the VCSEL 7.

The excitation light source is not limited to the VCSEL 7, but can be an edge emitting laser or the like, as long as it is a light source that emits light of an absorption wavelength of Nd:YAG being a laser medium. Moreover, excitation light is transmitted by an optical fiber 13 to be gathered at the laser medium in the present embodiment, but it can be gathered at the laser medium directly from the VCSEL 7.

Figure 4:
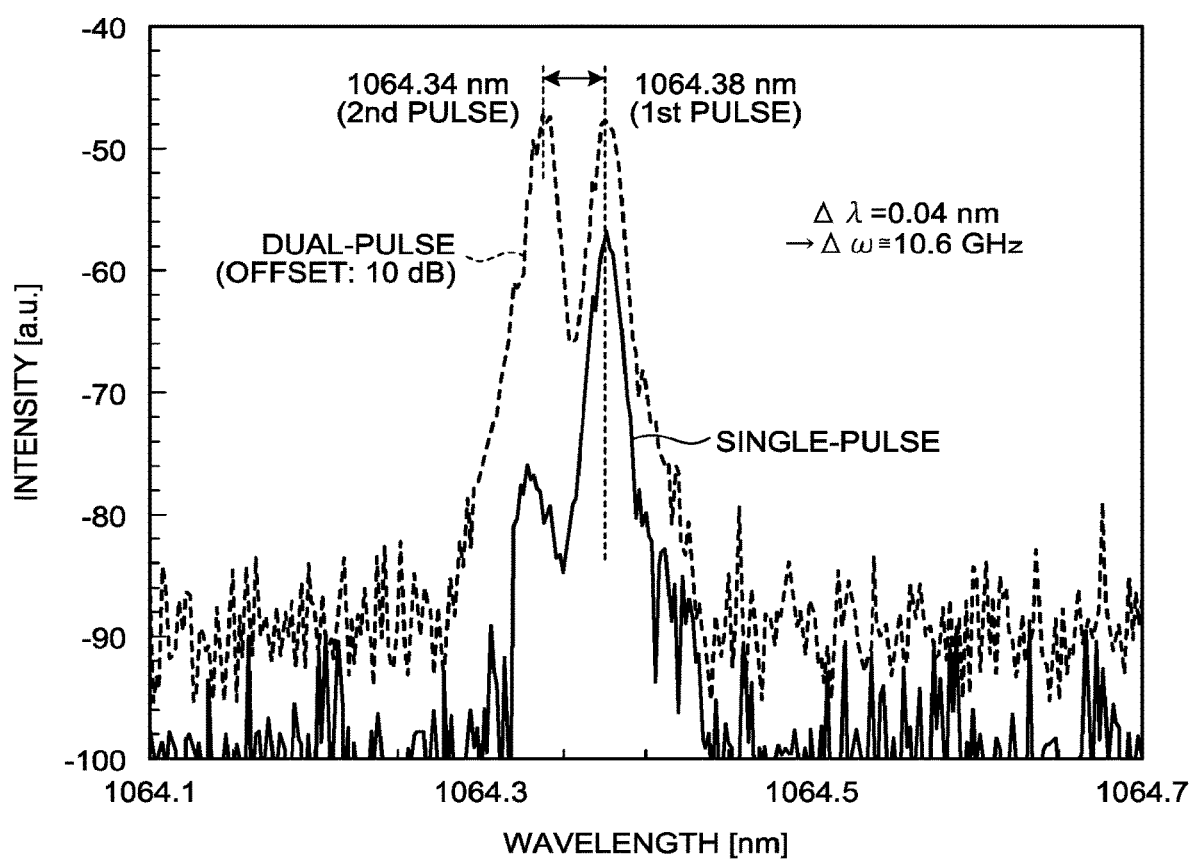
FIG. 4 is a diagram showing an example of an oscillation spectrum of the microchip laser.

FIG. 4 is a diagram showing an example of an oscillation spectrum of the microchip laser 6. The example shown in FIG. 4 shows an oscillation wavelength in the case of a single pulse (solid line) and a result obtained by measuring oscillation wavelengths of a first pulse and a second pulse soon after the second pulse is oscillated (broken line).

As shown in FIG. 4, it is found that there are two peaks in wavelength when two pulses are measured at the same time while a peak of wavelength is one when only a single pulse is oscillated. As one of the peak wavelengths matches with the peak wavelength when only one pulse is oscillated, it is understood that the second pulse is oscillated at another peak wavelength.

In addition, while the peak wavelength of the first pulse is 1064.38 nm, the peak wavelength of the second pulse is 1064.34 nm, and the wavelength difference is 0.04 nm. On the other hand, the resonator length used for the microchip laser 6 at this time is 7 millimeters (mm), and Free Spectral Range (FSR) of the laser resonator 8 considering the refractive index (n=1.82) can be calculated as $\Delta\lambda$=0.04 nm, and it coincides with the wavelength difference between the first pulse and the second pulse. That is, it was found that when the microchip laser 6 is caused to oscillate multiple pulses, an oscillation wavelength of each pulse varies as much as FSR of the laser resonator 8 of the microchip laser 6.

Next, a variation of oscillation wavelength is explained.

Figure 5:
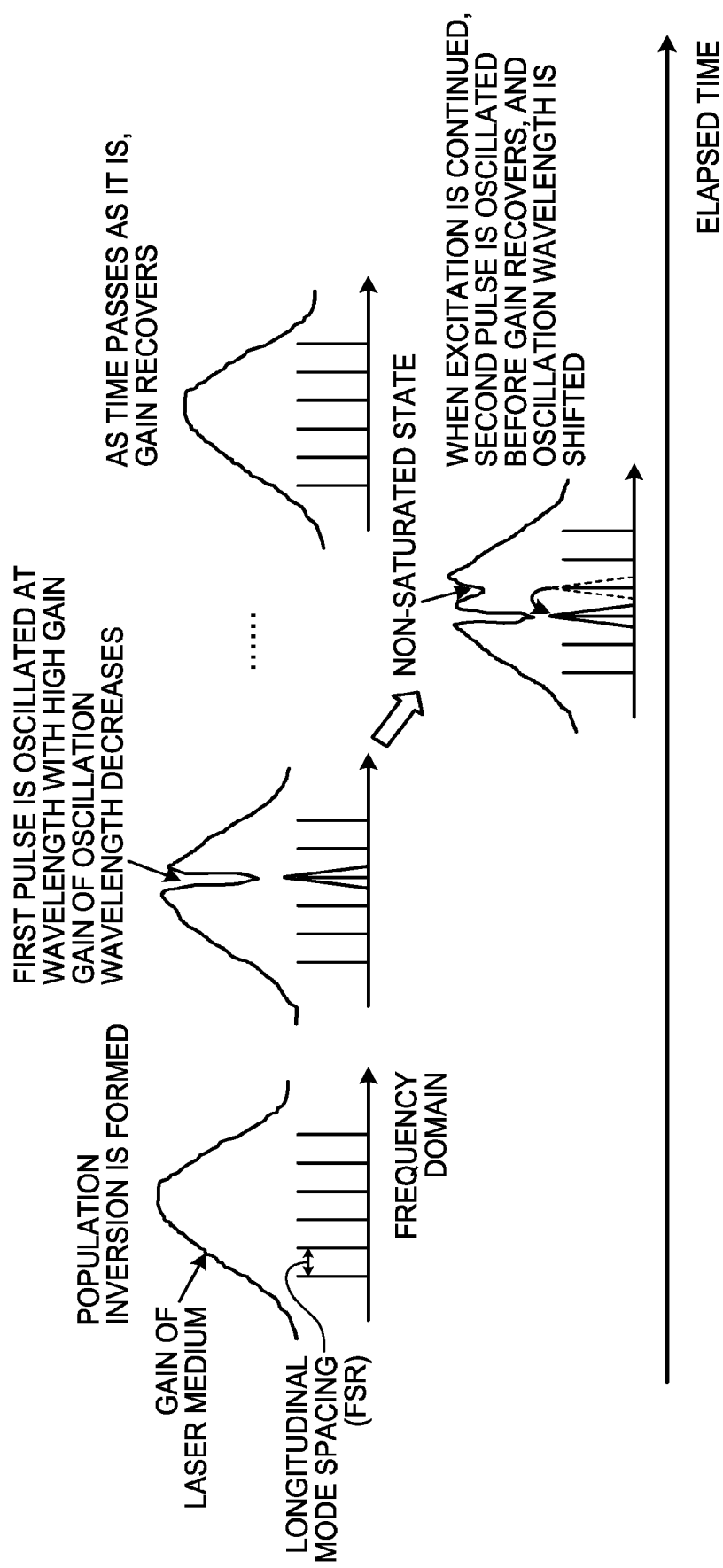
FIG. 5 is a diagram showing a relationship between a hole burning effect and a laser oscillation wavelength.

FIG. 5 is a diagram showing a relationship between a hole burning effect and a laser oscillation wavelength. As shown in FIG. 5, the laser medium has nonuniformly distributed gain. On the other hand, the oscillation wavelength of a laser is determined based on an integral multiple of FSR of laser resonator $\Delta\omega$=c/2 nL that is determined by the resonator length L of the laser resonator 8 and the refractive index n of the laser resonator 8, and on the gain of the laser medium. The wavelength apt to be oscillated at is determined by FSR $\Delta\omega$ in the gain of the laser medium. When the laser medium is excited and the gain becomes sufficiently high to form population inversion, oscillation occurs at a wavelength with the highest gain among the vertical modes. When this laser oscillation occurs, the hole burning that the gain of the laser medium decreases at the oscillation wavelength occurs.

When there is sufficiently long time until next laser oscillation, the gain at the oscillation wavelength recovers and a laser beam of the same wavelength is oscillated. However, when time until next laser oscillation is short enough, the population inversion is formed before the gain recovers and, therefore, a laser beam is oscillated at a wavelength at the next highest gain among the vertical modes in the resonator length of the laser resonator 8. That is, when laser beams are oscillated at significantly short time intervals, oscillation wavelengths vary by the hole burning effect, and the variation is dependent on FSR of the laser resonator 8. As this hole burning effect is a phenomenon that can occur in all kinds of laser mediums not limited to Nd:YAG used in the present embodiment, the laser medium is not limited to Nd:YAG.

In conventional is-TPG terahertz-wave sources, a laser beam of a single wavelength is oscillated by a solid state laser in a single terahertz-wave generation cycle, that is, in one excitation process of a microchip laser by an excitation light source. Therefore, when it is desired to vary wavelengths of terahertz waves to be generated, in addition to the necessity to provide a wavelength variable function to the seed source, the time interval at which frequencies of generated terahertz wave can be switched is dependent on the repetition frequency of the solid state laser.

In the present embodiment, the microchip laser 6 that oscillates at least two or more high-peak-power short pulse laser beams at different oscillation times in one excitation process by changing the structure of the laser resonator 8 or the excitation conditions of the excitation light is used as the pump light source (excitation light source). When the microchip laser 6 is caused to oscillate multiple pulses at different oscillation times in one excitation process, the oscillation wavelength varies per oscillation pulse by the hole burning effect, and the variation in wavelength is controlled by FSRs of the laser resonator 8 of the microchip laser 6.

Figure 6:
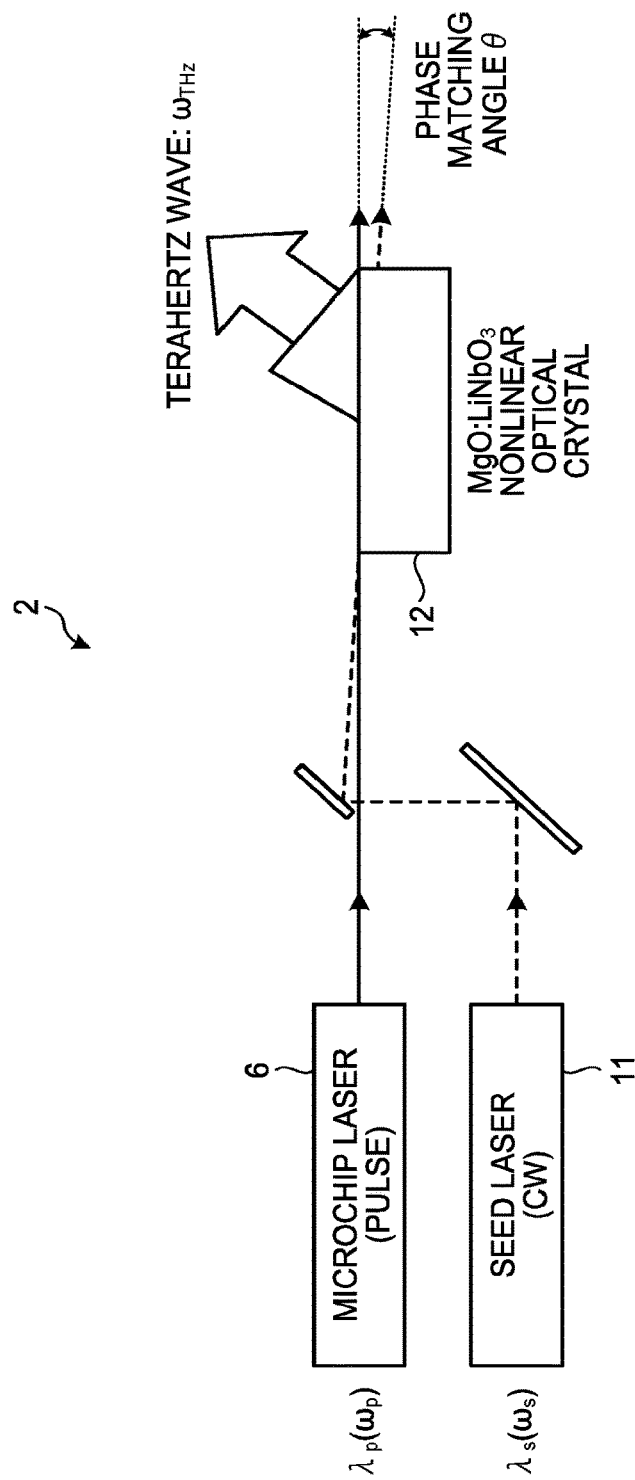
FIG. 6 is a diagram showing an outline of a pulsed electromagnetic wave generator.
Figure 7:
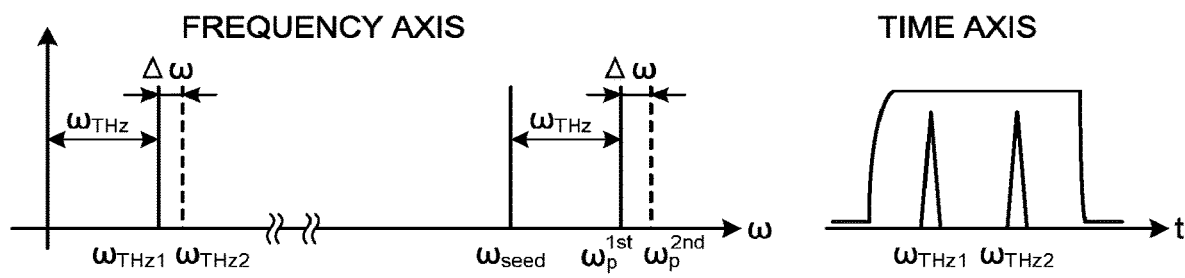
FIG. 7 is a diagram showing a terahertz wave in a frequency axis and a time axis.

FIG. 6 is a diagram showing an outline of the pulsed electromagnetic-wave generator 2, and FIG. 7 is a diagram showing a terahertz wave in a frequency axis and a time axis. As shown in FIG. 6, the pulsed electromagnetic-wave generator 2 uses the is-TPG terahertz-wave source.

As shown in FIG. 7, when a pulse enters the wavelength converting device 12, which is MgO:LiNbO$_3$ crystal, at a phase matching angle with a frequency difference of $\omega\_THz$ (=$\omega p\_1^{st}$–$\omega\_seed$) between the first pulse oscillated by the microchip laser 6 and that of the seed laser 11, a terahertz wave with the center frequency of $\omega\_THz$ is generated. Because the second pulse generated by the microchip laser 6 is to be shifted in frequency from the first pulse as much as FSR $\Delta\omega$ of the laser resonator 8, a terahertz wave with the center frequency of $\omega\_THz+\Delta\omega$ is generated.

As described above, by using the microchip laser 6 that oscillates pulses with different oscillation times and different oscillation wavelengths in one excitation process as the pump light source (excitation light source), multiple terahertz-wave pulses with different frequencies can be generated in one excitation process in a temporally separated manner without a wavelength variable function for seed light. In addition, the time interval of pulses oscillated by the microchip laser is several kHz to several tens of kHz order although it depends on the excitation condition and the like. This is more than one digit faster than the repetition frequency of a solid state laser. That is, unlike the conventional is-TPG terahertz-wave generators, at least two or more pieces of frequency information can be acquired in one excitation process, and the time interval for acquisition is short. In addition, a wavelength variable function is not necessary, enabling to simplify the system structure.

Although the is-TPG terahertz-wave generator using a MgO:LiNbO$_3$ crystal has been described in the present embodiment, it can be an inorganic nonlinear optical crystal, such as KTP, SiO$_2$, GaAS, and GaP, or an organic nonlinear optical crystal, such as DAST and BNA, not limited to the MgO:LiNbO$_3$ crystal.

FIG. 8 is a diagram showing a measurement result of an optical pulse and a terahertz wave pulse from the microchip laser 6. FIG. 8 is a time waveform when one pulse, two pulses, and three pulses, sequentially from the bottom, are oscillated in one excitation process. Comparing the respective wavelengths, it is recognized that terahertz wave pulses are also oscillated at the same time intervals as the microchip laser 6 when the microchip laser 6 is caused to oscillate two or more pulses.

Figure 9:
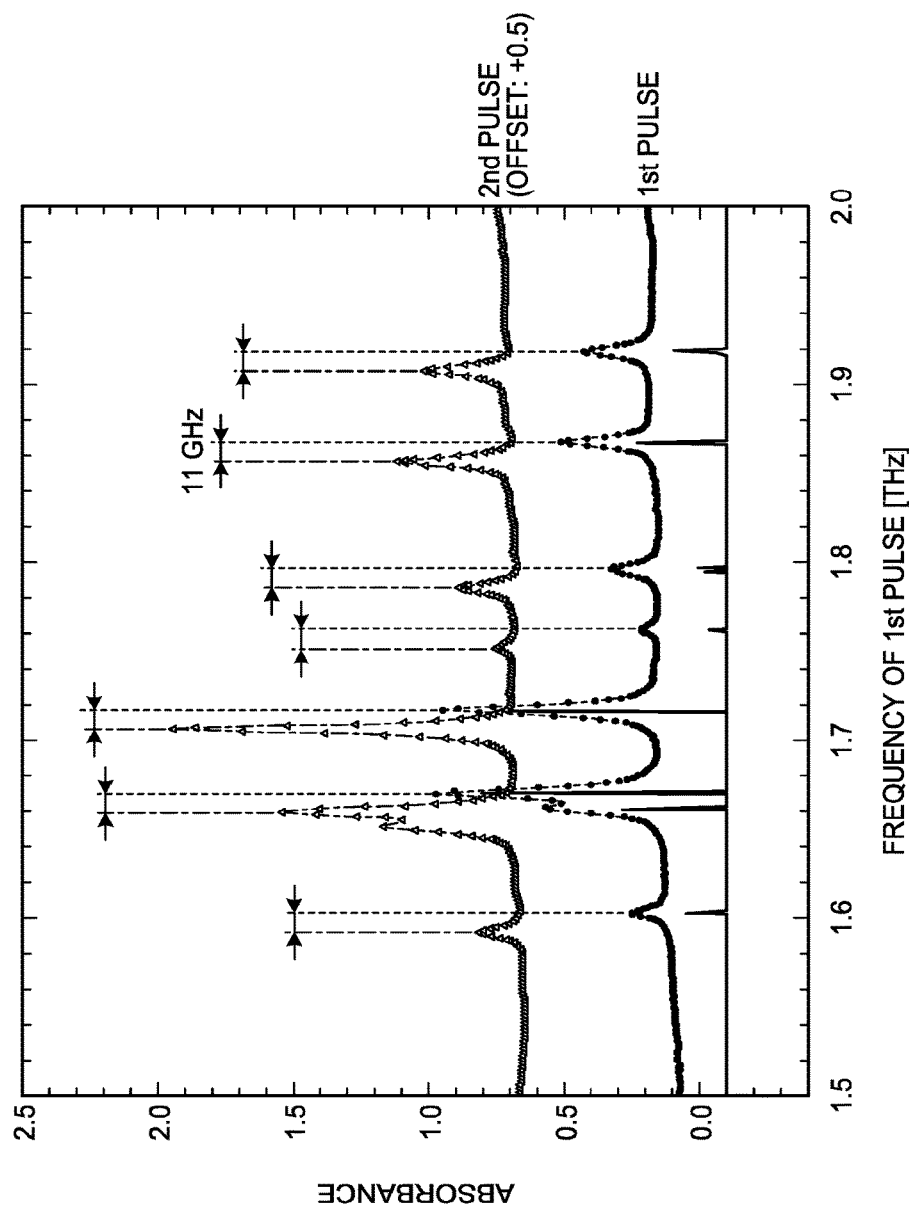
FIG. 9 is a diagram showing a measurement result of an absorption spectrum of water vapor in a dual pulse oscillation state.

FIG. 9 is a diagram showing a measurement result of an absorption spectrum of water vapor in a dual pulse oscillation state. FIG. 9 shows a result of measuring absorption spectrum of water vapor using a wavelength variable laser as the seed laser 11 in a state in which the microchip laser 6 is caused to oscillate two pulses under condition shown in FIG. 4. The intensities of the respective oscillated first terahertz-wave pulse and second terahertz-wave pulse were independently detected at spectrum.

As shown in FIG. 9, it is recognized that a characteristic spectrum of water vapor is detected for each of the first and second pulses, but the second spectrum is shifted to be lower frequency by 11 gigahertz (GHz) from the first spectrum. This is because while the wavelength of the seed light source is maintained to be constant, the wavelengths of the first pulse and the second pulse of the pump light (excitation light) vary within one excitation process. As shown in FIG. 4, the second pulse is of a shorter wavelength (higher frequency) compared to the first pulse. As for the generated terahertz wave pulse also, the frequency of the second terahertz wave pulse is higher than that of the first terahertz wave pulse and, therefore, the frequency of the second terahertz wave pulse appears to be shifted toward the lower frequency side when spectrum occurs based on the first pulse as a reference. That is, from FIG. 9, it was confirmed that the generated terahertz wave pulses also vary in frequency as much as FSR of the microchip laser.

Figure 10:
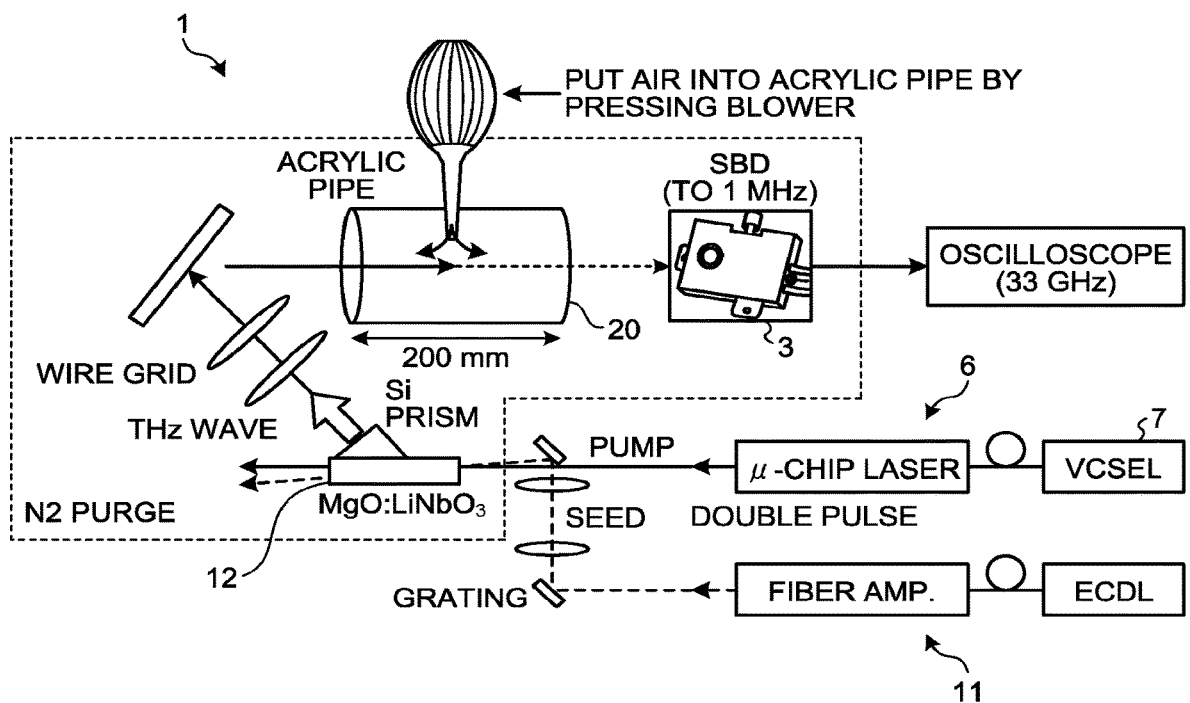
FIG. 10 is a diagram showing a measuring apparatus.
Figure 11:
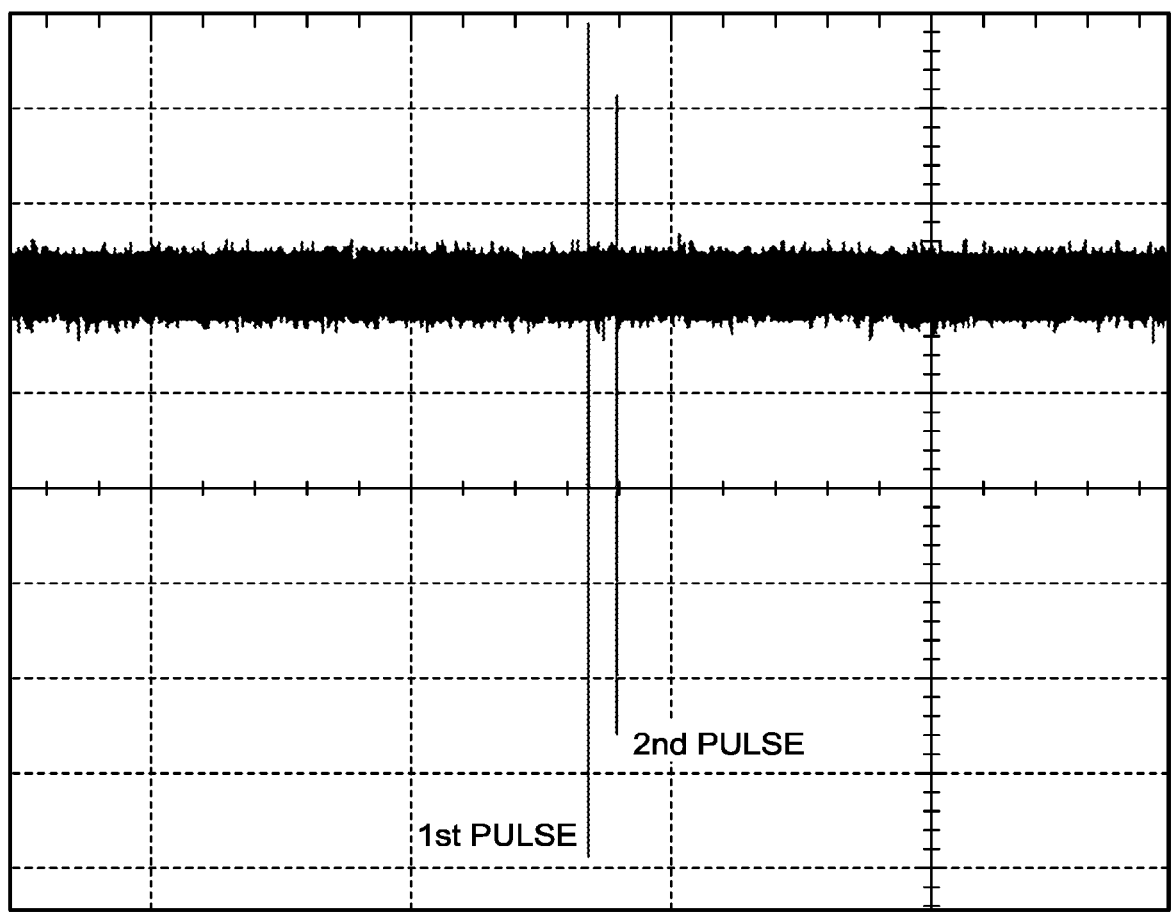
FIG. 11 is a diagram showing a detection signal of a terahertz wave in a Schottky barrier diode (SBD)

FIG. 10 is a diagram showing the measuring apparatus 1, and FIG. 11 is a diagram showing a detection signal of a terahertz wave in an SBD. The measuring apparatus 1 performs differential absorption measurement of water vapor by using the is-TPG terahertz-wave generator that generates terahertz wave pulses with different oscillation wavelengths and oscillation times in one excitation process explained in the section up to FIG. 9.

As shown in FIG. 10, a terahertz wave pulse emitted from the is-TPG terahertz-wave source propagates in nitrogen purged atmosphere, to be detected by the SBD serving as the detector 3. A gas cell 20 that can take in air is provided in an optical path of the terahertz wave between the is-TPG terahertz-wave source and the SBD. An intensity variation of the terahertz wave when the gas cell 20 takes in air from the nitrogen purged state is detected by the SBD. When two pulses are oscillated by one excitation process from the pump light source (excitation light source), terahertz waves detected by the SBD can be detected at different timings as shown in FIG. 11.

Figure 12:
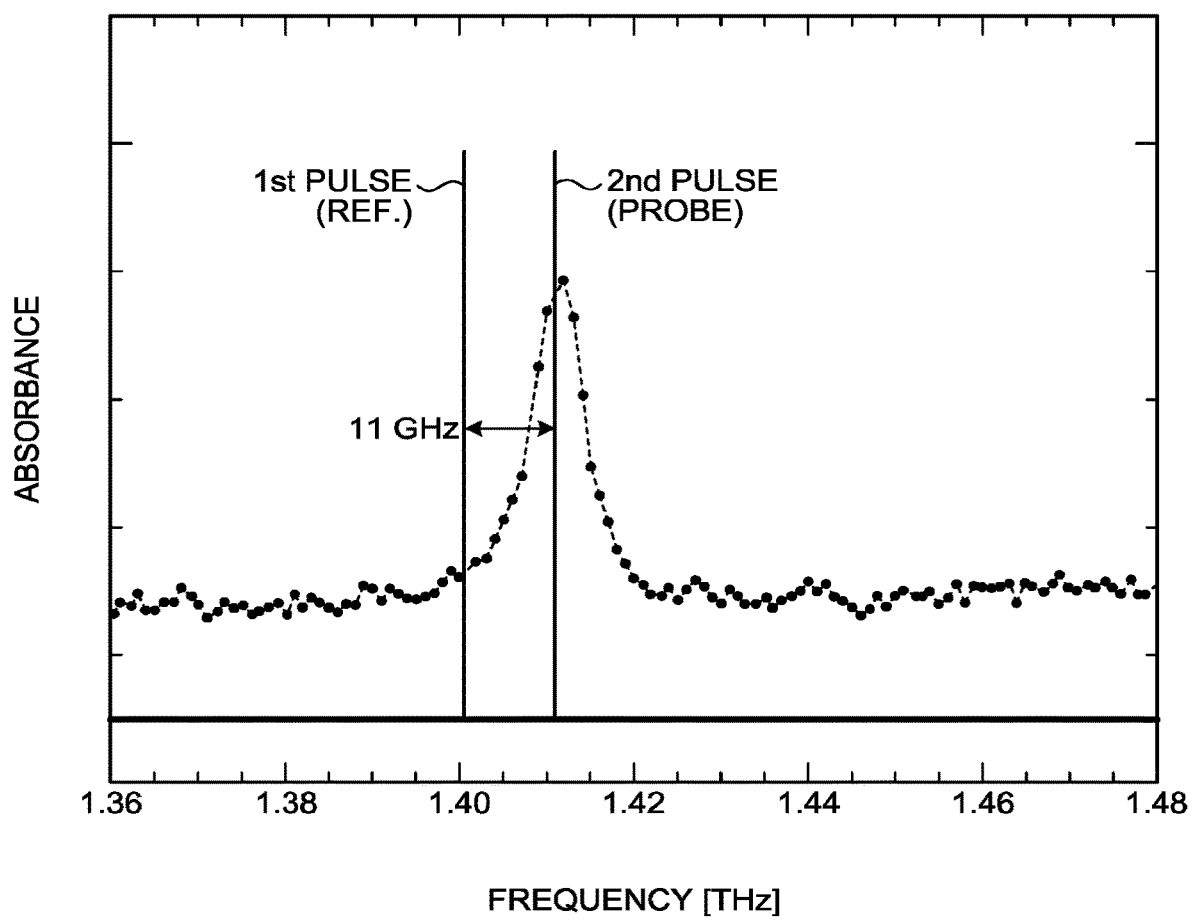
FIG. 12 is a diagram showing frequency setting of a terahertz wave in differential absorption measurement.

FIG. 12 is a diagram showing frequency setting of a terahertz wave in differential absorption measurement. When differential absorption measurement is performed, it is set to an absorption frequency of a gas desired to be measured by the second pulse (in this example, water vapor) as shown in FIG. 12. Because the first pulse is shifted in frequency as much as FSR of the pump light source (excitation light source), it appears at the foot of the absorption peak. When the pump light source is caused to oscillate at a frequency of 50 Hz with the setting as above, it is possible to measure information of two frequencies of an absorption frequency and a frequency at its foot at the time interval of the same 50 Hz.

Figure 13:
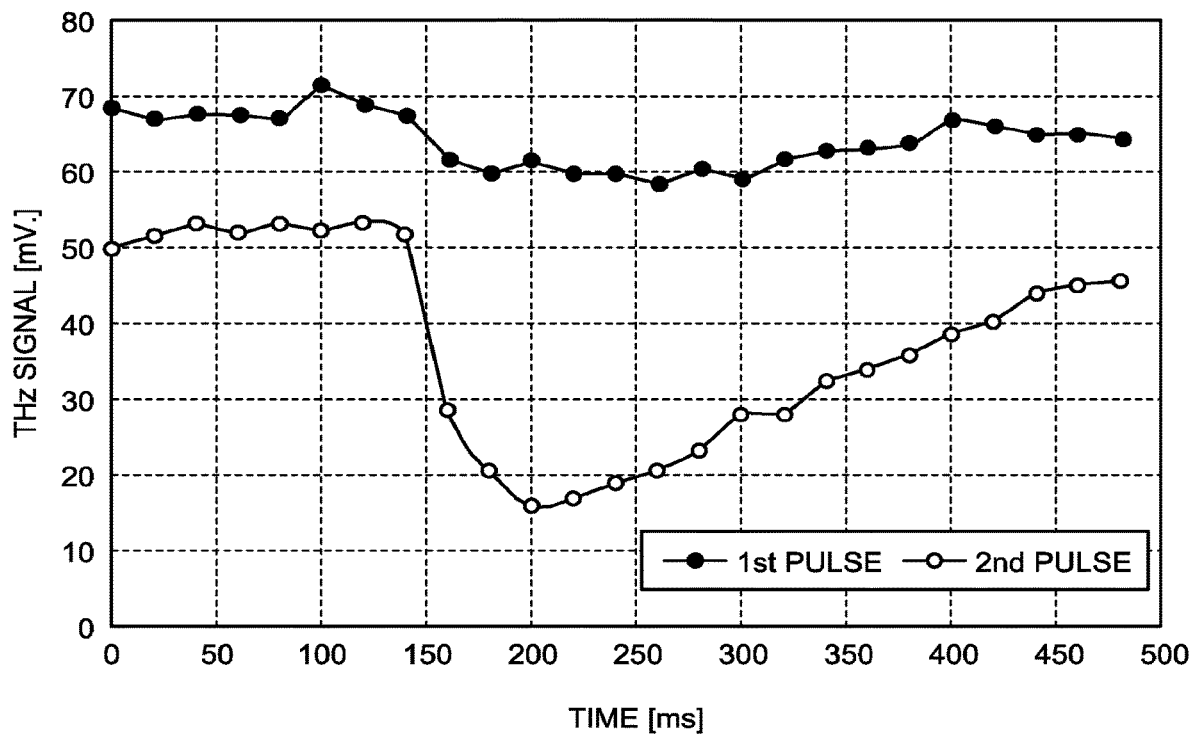
FIG. 13 is a diagram showing changes in pulse intensity of a terahertz wave over time.

FIG. 13 is a diagram showing changes in pulse intensity of a terahertz wave over time. FIG. 13 shows a result of measuring detection intensity changes of respective pulses over time when air is flown into the nitrogen-purged gas cell 20 under the above condition. While the first pulse at the foot of an absorption band changes in intensity slightly as air is put in, the second pulse absorbs water vapor at timing when air is put in, and the detection intensity of the terahertz wave significantly decreases, and the detection intensity increases as nitrogen increases again. From this, it is recognized that each terahertz wave pulse can be measured by the repetition frequency of the pump light source.

Figure 14:
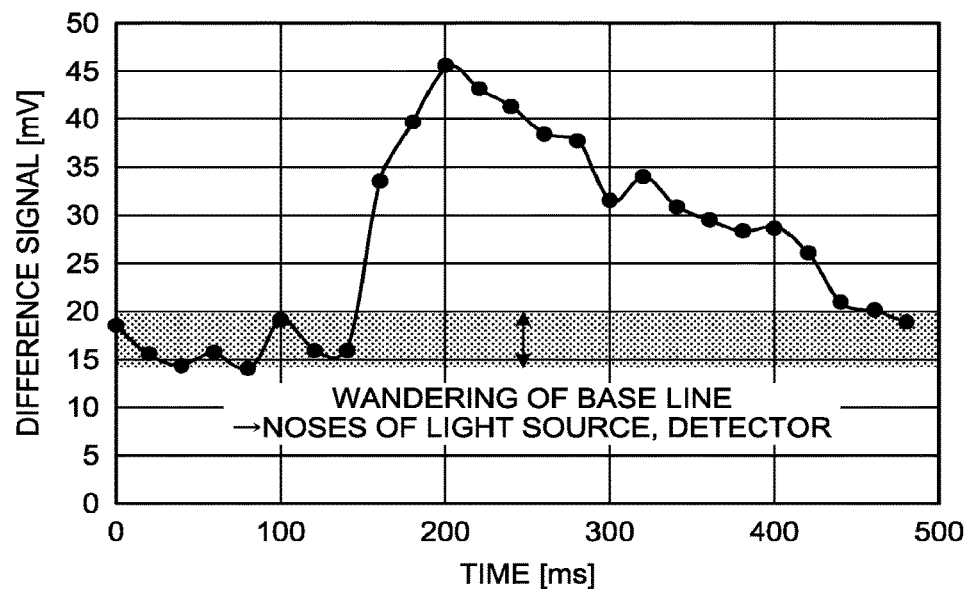
FIG. 14 is a diagram showing a difference in intensity between a first pulse and a second pulse in FIG. 13.

FIG. 14 is a diagram showing a difference in intensity between the first pulse and the second pulse in FIG. 13. FIG. 14 indicates that the difference intensity of terahertz wave significantly increases at timing when water vapor is put in, and that an early change of state of gas inside the gas cell 20 can be detected. Moreover, in a time period before water vapor is put in, the signal intensity wanders. This indicates wandering of the terahertz wave generator and the detector 3, and this stroke width is to be the base line of quantitative measurement.

As described above, in the present embodiment, at least two or more pieces of frequency information can be acquired in one excitation process, and the time interval for acquisition is short and, therefore, the measurement accuracy in molecule measurement can be improved. Moreover, a time interval of generated terahertz waves is a value that can be detected by the detector 3 used in a terahertz wave band, such as SBD, and that can be time resolved.

According to the present invention, an effect that degradation of measurement accuracy can be prevented that can occur due to a change of condition of a measuring object when a substance that is apt to change the concentration according to an environmental situation is measured is obtained.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A pulsed electromagnetic-wave generator comprising:
an excitation light source;
a laser resonator which excitation light from the excitation light source enters;
a pulse generating unit configured to generate a pulsed light group including at least two or more pulses with different frequencies ($\omega$) and different oscillation timings (t) in one excitation process of the excitation light source, an oscillation frequency difference ($\Delta\omega$) between the pulses in the pulsed light group being an integral multiple of a Free Spectral Range (FSR) of the laser resonator; and
a wavelength converting unit which the pulsed light group enters, and that is configured to generate a pulsed electromagnetic wave in which a wavelength of each pulse in the pulsed light group is converted.

2. The pulsed electromagnetic-wave generator according to claim 1, wherein
the pulse generating unit is a Q-switch device.

3. The pulsed electromagnetic-wave generator according to claim 1, wherein
the wavelength converting unit includes
a laser light source configured to oscillate a laser beam of a frequency different from the pulse generating unit; and
a wavelength converting device configured to generate a pulsed electromagnetic wave of a frequency corresponding to a frequency difference between the pulsed light group and the laser beam.

4. The pulsed electromagnetic-wave generator according to claim 3, wherein
the wavelength converting device is a lithium niobate ($MgO:LiNbO_3$) crystal doped with magnesium oxide.

5. A measuring apparatus comprising:
the pulsed electromagnetic-wave generator according to claim 1; and
a detector capable of detecting pulsed electromagnetic waves with different oscillation frequencies and oscillation times generated by the pulsed electromagnetic-wave generator in a temporally separated manner.

* * * * *